(12) United States Patent
Shim et al.

(10) Patent No.: US 9,921,728 B2
(45) Date of Patent: Mar. 20, 2018

(54) SERVICE PROVIDING DEVICE, AND METHOD OF PROVIDING A USER INTERFACE

(71) Applicant: SAMSUNG ELECTRONICS CO., LTD., Suwon-si (KR)

(72) Inventors: Jung-hyun Shim, Suwon-si (KR); Ji-hyeon Kweon, Yongin-si (KR); Kang-min Lee, Hwaseong-si (KR); Yeon-hee Lee, Seoul (KR); Sun-mi Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 339 days.

(21) Appl. No.: 13/966,333

(22) Filed: Aug. 14, 2013

(65) Prior Publication Data
US 2014/0173479 A1 Jun. 19, 2014

(30) Foreign Application Priority Data

Dec. 17, 2012 (KR) ........................ 10-2012-0147718

(51) Int. Cl.
| | | |
|---|---|---|
| G06F 3/048 | (2013.01) | |
| G06F 3/0484 | (2013.01) | |
| G06F 9/44 | (2018.01) | |
| H04L 12/28 | (2006.01) | |
| H04L 12/24 | (2006.01) | |
| H04L 29/08 | (2006.01) | |

(52) U.S. Cl.
CPC ........ *G06F 3/04842* (2013.01); *G06F 9/4443* (2013.01); *H04L 12/2814* (2013.01); *H04L 41/5058* (2013.01); *H04L 67/36* (2013.01); *H04L 12/282* (2013.01); *H04L 12/2809* (2013.01); *H04L 12/2816* (2013.01); *H04L 29/08648* (2013.01); *H04L 67/30* (2013.01)

(58) Field of Classification Search
CPC ............... H04L 12/2814; H04L 12/282; H04L 29/08648; H04L 12/2809; H04L 12/2816
See application file for complete search history.

(56) References Cited

U.S. PATENT DOCUMENTS

| | | | |
|---|---|---|---|
| 6,198,479 B1 * | 3/2001 | Humpleman et al. | 715/733 |
| 6,216,158 B1 * | 4/2001 | Luo et al. | 709/217 |
| 6,700,592 B1 | 3/2004 | Kou et al. | |
| 7,043,532 B1 * | 5/2006 | Humpleman et al. | 709/208 |
| 7,200,683 B1 * | 4/2007 | Wang et al. | 709/250 |
| 7,584,263 B1 * | 9/2009 | Hicks et al. | 709/217 |

(Continued)

FOREIGN PATENT DOCUMENTS

| | | |
|---|---|---|
| KR | 10-0790311 B1 | 1/2008 |
| WO | 2012/094356 A1 | 7/2012 |

OTHER PUBLICATIONS

Communication dated Feb. 20, 2014, issued by the European Patent Office in counterpart European Application No. 13180784.4.

*Primary Examiner* — Patrick F Riegler
(74) *Attorney, Agent, or Firm* — Sughrue Mion, PLLC

(57) ABSTRACT

A screen providing device and a method of providing a user interface (UI) are provided. The method includes operations of selecting a service to be provided via a service providing device; selecting a UI configuring element stored in a database, based on the selected service; and displaying on a screen a UI comprising the UI configuring element.

31 Claims, 8 Drawing Sheets

(56) References Cited

U.S. PATENT DOCUMENTS

| | | | |
|---|---|---|---|
| 2001/0002473 A1* | 5/2001 | Waldo | G06F 9/465 709/229 |
| 2003/0036350 A1* | 2/2003 | Jonsson | H04W 48/20 455/41.1 |
| 2003/0103088 A1* | 6/2003 | Dresti | G06F 3/0481 715/835 |
| 2004/0003058 A1* | 1/2004 | Trossen | H04L 29/06027 709/220 |
| 2004/0070491 A1* | 4/2004 | Huang et al. | 340/10.5 |
| 2004/0150546 A1* | 8/2004 | Choi | 341/176 |
| 2004/0205244 A1* | 10/2004 | Marsico | H04L 51/38 709/245 |
| 2005/0027659 A1* | 2/2005 | Kumar | G06F 9/5027 705/400 |
| 2005/0097478 A1 | 5/2005 | Killian et al. | |
| 2005/0120301 A1* | 6/2005 | Humpleman et al. | 715/515 |
| 2006/0253782 A1* | 11/2006 | Stark | G06F 17/30053 715/727 |
| 2007/0136693 A1* | 6/2007 | Lilleness et al. | 715/835 |
| 2009/0027222 A1* | 1/2009 | Larsson | H04W 4/02 340/686.6 |
| 2009/0320113 A1* | 12/2009 | Larsen et al. | 726/7 |
| 2010/0071053 A1* | 3/2010 | Ansari | G06Q 30/04 726/12 |
| 2010/0115433 A1* | 5/2010 | Lee | H04L 12/2809 715/763 |
| 2010/0131627 A1 | 5/2010 | Son et al. | |
| 2010/0238183 A1* | 9/2010 | Sakanaka | H04N 7/163 345/501 |
| 2010/0241978 A1 | 9/2010 | Genovese et al. | |
| 2010/0262467 A1* | 10/2010 | Barnhill et al. | 705/10 |
| 2011/0061011 A1* | 3/2011 | Hoguet | G06F 3/0482 715/769 |
| 2011/0125601 A1* | 5/2011 | Carpenter | G06Q 30/06 705/26.1 |
| 2011/0138327 A1* | 6/2011 | Scott | G06F 3/0481 715/810 |
| 2011/0208359 A1* | 8/2011 | Duchene | G05B 15/02 700/275 |
| 2011/0271200 A1* | 11/2011 | Kikkawa | G06F 17/30017 715/744 |
| 2011/0299550 A1* | 12/2011 | Karaoguz | G06Q 20/10 370/401 |
| 2012/0143355 A1* | 6/2012 | Honma | H04L 12/2807 700/17 |
| 2012/0144058 A1* | 6/2012 | Ohashi et al. | 709/232 |
| 2012/0166642 A1* | 6/2012 | Saint Clair et al. | 709/225 |

* cited by examiner

FIG. 5

| UI CONFIGURING ELEMENT ID | SERVICE | INFORMATION TYPE | SERVICE ATTRIBUTE | UI CONFIGURING ELEMENT | UI CONFIGURING ELEMENT (with values) |
|---|---|---|---|---|---|
| 0.1.2 | INQUIRY ABOUT USER NAME | TEXT | -FIRST NAME, LAST NAME | FIRST NAME, LAST NAME | Payl. Bennett |
| 0.1.3 | INQUIRY ABOUT WEATHER, WEATHER INFORMATION | TEXT | -WEATHER CONDITION -DATE, MONTH, DAY | WEATHER CONDITION/ DATE, MONTH, DAY | Partly Sunny/Monday, March 21 |
| 0.1.5 | ALARM INDICATING UNREAD MESSAGE, AND INQUIRY ABOUT MESSAGE | TEXT / ICON | -TOTAL NUMBER OF UNREAD MESSAGES -AGENT IMAGE -BALLOON IMAGE | Agent IMAGE / BALLOON IMAGE TOTAL NUMBER OF UNREAD MESSAGES | :-) |
| 0.1.6 | ALARM, MESSAGE CHECK | TEXT WINDOW / TEXT | -FLOWING-TYPE NEW MESSAGE WINDOW -CONTENT OF HELP GUIDE | CONTENT OF HELP GUIDE | What can I help you? |
| 0.1.4 | ALARM, INQUIRY, AND CHECK IN REGARD TO MESSAGE | | -TOTAL NUMBER OF UNREAD MESSAGES -AGENT IMAGE -BALLOON IMAGE -FLOWING-TYPE NEW MESSAGE WINDOW -CONTENT OF HELP GUIDE | | TOTAL NUMBER OF ALARM MESSAGES / What can I help you? |
| 1.1.3 | INQUIRY ABOUT FRONT DOOR OF HOUSE | IMAGE | -FRONT DOOR IMAGE | FRONT DOOR IMAGE | [image] |
| 1.1.11 | POWER ON/OFF | TEXT / ICON | -PRODUCT NAME -POWER CONSUMPTION | TEXT / ICON | Lights (icon) |
| 1.1.12 | 방 별 조명 on/off | TEXT / ICON | -PRODUCT NAME -POWER CONSUMPTION -POSITION IN HOUSE | TEXT / ICON | Power (icon) |
| 1.2.6 | INQUIRY ABOUT ADVERTISEMENT RELATED TO EACH ROOM | IMAGE | -ADVERTISEMENT -POSITION IN HOUSE | IMAGE | [image] |
| 1.2.9 | INQUIRY ABOUT DEVICE | TEXT | -DEVICE NAME -DEVICE STATUS -CHARGE FOR USING ENERGY BY DEVICE THIS MONTH -QUANTITY OF ENERGY USAGE BY DEVICE THIS MONTH | IMAGE DEVICE NAME ☐ STATUS $ USAGE CHARGE/ USAGE QUANTITY KW | Lamp #1 ☐ ON $29.3/20.9kw |
| | | IMAGE | -DEVICE IMAGE -DEVICE STATUS IMAGE | | |

FIG. 8
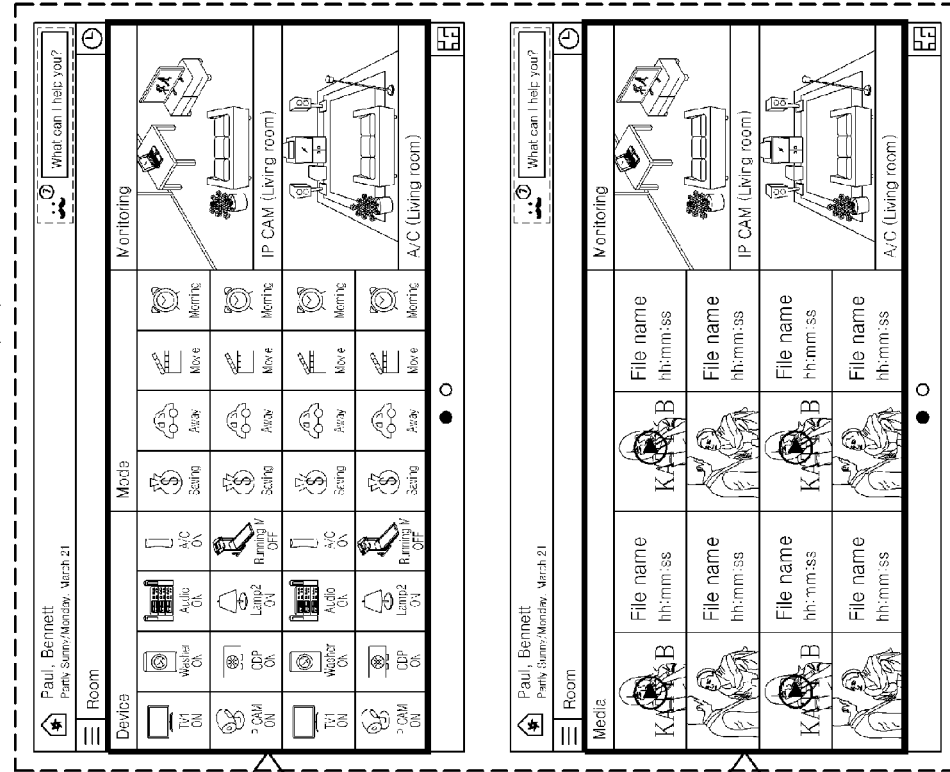
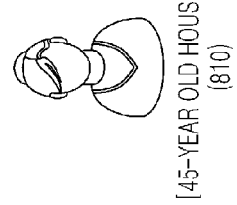
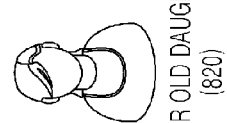

SERVICE PROVIDING DEVICE, AND METHOD OF PROVIDING A USER INTERFACE

CROSS-REFERENCE TO RELATED PATENT APPLICATION

This application claims the benefit of Korean Patent Application No. 10-2012-0147718, filed on Dec. 17, 2012, in the Korean Intellectual Property Office, the disclosure of which is incorporated herein by reference, in its entirety.

BACKGROUND

1. Field

The present disclosure relates to a method of providing a user interface (UI) and a service providing device. More particularly, the exemplary embodiments relate to a method of providing a UI and a service providing device, whereby the UI is provided according to a service that is to be actually provided to a user and that is from among services that the service providing device may perform.

2. Description of the Related Art

Various electronic products are arranged in houses or buildings, and various automation technologies such as an intelligent house or an intelligent building are being developed. Also, service providing devices which provide services related to automation technologies are being developed.

By using the service providing devices, various services such as a service using various automation technologies, an information display service, or an information transmission service, may be provided to a user.

However, there may be a service that is not desired by the user or that is not actually provided to the user due to an absence of a related external device, wherein the service is from among various services that the service providing device may perform. In this case, the service providing device may still output a user interface (UI) relating to the service that is not actually provided to the user along with a UI related to a service that is actually provided to the user. Accordingly, resources of the service providing device are wasted, and there is an increase of the complexity of a UI to be provided.

SUMMARY

The present disclosure provides a method of outputting a user interface (UI) which corresponds to a service that is actually provided to a user.

According to an aspect of the present disclosure, a method of outputting a user interface (UI) is provided. The method is performed by a service providing device for providing a UI which provides a service to a user. The method including operations of selecting a service to be provided via the service providing device; selecting a UI configuring element stored in a database, based on the selected service; and displaying a UI including the UI configuring element on a screen.

The UI configuring element may include a type of information containing at least one piece of information to be included in the UI.

The database may include a list of services that the service providing device can perform, and information relating to at least one service attribute of each of the services, and the operation of selecting the service may include an operation of selecting at least one service from the service list stored in the database, based on an attribute of a target object of the service.

The target object of the service may include one or more external devices which are connected to a network to which the service providing device is connected, and the operation of selecting the service may include operations of receiving from the one or more external devices information relating to an attribute of each of the one or more external devices and selecting the at least one service from the service list stored in the database, based on the service attribute and the information relating to the attribute.

The operation of displaying the UI may include displaying the UI configuring element on the screen, according to groups of the one or more external devices, wherein the groups are distinguished between the one or more external devices based on positions of the one or more external devices.

The target object of the service may include at least one piece of content that is stored in the service providing device or stored in at least one external device connected to a network to which the service providing device is connected, and the operation of selecting of the service may include an operation of selecting at least one service from the service list stored in the database, according to information relating to the service attribute and information relating to an attribute of the at least one piece of content.

The target object of the service may be one of a user of the service providing device, at least one external device connected to a network to which the service providing device is connected, a position of the at least one external device and content.

The operation of displaying the UI may include an operation of outputting on the screen the UI, including the UI configuring element that is selected in consideration of information about a user of the service providing device.

The information relating to the user may include at least one of an age of the user, a gender of the user, and an occupation of the user.

The operation of displaying the UI on the screen may include an operation of displaying a UI that has changed according to an update of the database.

According to another aspect of the exemplary embodiments, there is provided a service providing device for providing a user interface (UI) which provides a service to a user, the service providing device including a database which maps a list of services that the service providing device can perform to UI configuring elements, and storing the service list and the UI configuring elements; a controller which selects a service to be provided via the service providing device from the service list stored in the database, and selecting an UI configuring element stored in the database, based on the selected service; and a display which displays on a screen a UI including the UI configuring element.

The UI configuring element may include a type of information containing at least one piece of information to be included in the UI.

The database may include a service list of services that the service providing device can perform, and information relating to at least one service attribute of each of the services, and the controller may select at least one service from the service list stored in the database, based on an attribute of a target object of a service.

The target object of the service may include one or more external devices which are connected to a network to which the service providing device is connected, the service providing device may receive information relating to an attribute of each of the one or more external devices from the one or more external devices, and the controller may select the at least one service from the service list stored in the database, based on the service attribute and the information relating to the attribute.

The display may display the UI configuring element on the screen, according to groups of the one or more external devices, wherein the groups are distinguished between the one or more external devices based on positions of the one or more external devices.

The target object of the service may include at least one piece of content that is stored in the service providing device or at least one external device connected to a network to which the service providing device is connected, and the controller may select at least one service from the service list stored in the database, according to information relating to the service attribute and information relating to an attribute of the at least one piece of content.

The target object of the service may be one of a user of the service providing device, at least one external device connected to a network to which the service providing device is connected, a position of the at least one external device and content.

The display may output on the screen the UI which includes the UI configuring element that is selected in consideration of information relating to a user of the service providing device.

The information relating the user may include at least one of an age of the user, a gender of the user and an occupation of the user.

The service providing device may display on the screen a UI that has changed according to an update of the database.

An aspect of another exemplary embodiment may include a service providing device for providing a user interface (UI), including: a database configured to map a list of services for UI configuring elements, and store the service list and the UI configuring elements; a controller configured to select a UI configuring element stored in the database; and a display configured to display on a screen a UI including a UI configuring element. The UI configuring element includes an information type of at least one piece of information configured to be in the UI.

The database may include a list of services that the service providing device is configured to perform, and includes information relating to at least one service attribute of each of the services.

The controller may be configured to select at least one service from the service list stored in the database, based on an attribute of a target object of a service.

The target object of the service may be one of a user of the service providing device, at least one external device connected to a network to which the service providing device is connected, a position of the at least one external device, and content.

BRIEF DESCRIPTION OF THE DRAWINGS

The above and other features and advantages of the present invention will become more apparent by describing in detail exemplary embodiments thereof with reference to the attached drawings in which:

FIG. 5 illustrates a UI configuring element library stored in the database, according to an exemplary embodiment;

FIG. 8 illustrates an example in which UIs that are changed according to users are output, according to an exemplary embodiment.

DETAILED DESCRIPTION OF THE EXEMPLARY EMBODIMENTS

Figure 1:
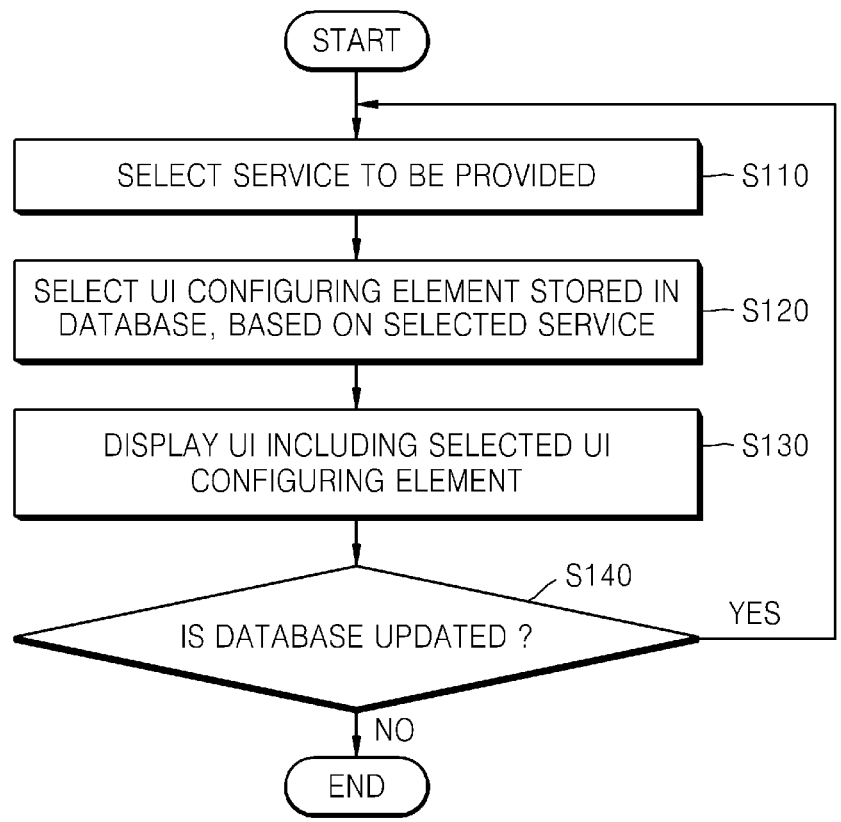
FIG. 1 is a flowchart of a method of providing a user interface (UI), performed by a service providing device, according to an exemplary embodiment.

Hereinafter, the present disclosure will be described in detail by explaining exemplary embodiments thereof with reference to the attached drawings. The invention may, however, be embodied in many different forms, and should not be construed as being limited to the exemplary embodiments set forth herein. Rather, these exemplary embodiments are provided so that this disclosure will be thorough and complete, and will fully convey the concept of the exemplary embodiments to those of ordinary skill in the art. In the following description, well-known functions or constructions are not described in detail since they would obscure the disclosure with unnecessary detail, and like reference numerals in the drawings denote like or similar elements throughout the specification.

Throughout the specification, it will also be understood that when an element is referred to as being "connected to" another element, it can be directly connected to the other element, or it can be electrically connected to the other element while intervening elements may also be present. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof.

Expressions such as "at least one of," when preceding a list of elements, modify the entire list of elements and do not modify the individual elements of the list.

FIG. 1 is a flowchart of a method of providing a user interface (UI), performed by a service providing device 300, according to an exemplary embodiment.

The service providing device 300 may select a service to be provided to a user (operation S110). The service providing device 300 may select the service from information stored in a database 310.

The service may be a series of tasks that are performed via operation of the service providing device 300. For example, the service may include various tasks including control of the service providing device 300, an information display service, an information transmission service, an information search service, an information input service, control of an external device 350, a schedule management service, an advertisement providing service, a call connection service, a content reproduction service, an in-house security service, a monitoring service, a health care service, or the like.

The database 310 may store UI modeling information including a service list 420 that is a list of services that the service providing device 300 may perform. The service providing device 300 may select a service to be provided, from the service list 420 stored in the database 310. Specifically, the database 310 may exist in the service providing device 300 or may be formed as separate hardware.

Figure 4:
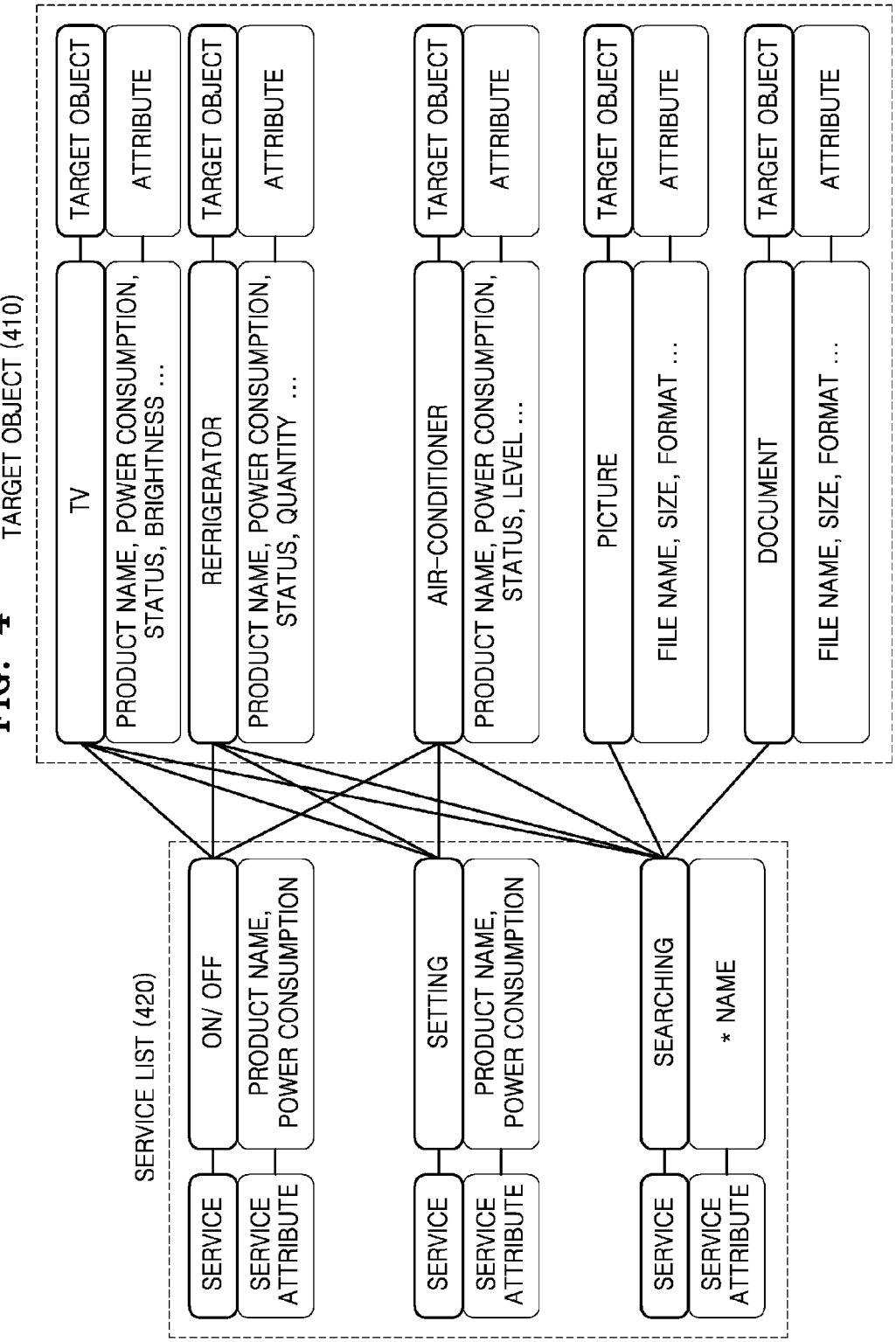
FIG. 4 illustrates a structure of UI modeling information stored in a database, according to an exemplary embodiment.

According to an exemplary embodiment, the UI modeling information stored in the database 310 may include information relating to at least one service attribute of the service included in the service list 420. The service attribute corresponds to information that is previously set with respect to the service. For example, as shown in FIG. 4, when a service involves controlling the power of an external device, a service attribute of the service that involves controlling the power of the external device may be set as 'product name, power consumption.

The service providing device 300 may select at least one service from the service list 420 which is stored in the database 310, based on an attribute relating to a target object 410 of the service. The target object 410 of the service refers to an object that corresponds to a purpose of the service to be provided to the user. As an example, with respect to a television (TV) power control service, a TV to be controlled may be the target object 410 of the service. As another example, with respect to a search service, an external device or content to be searched or may be the target object 410 of the service. However, the target object 410 is not limited to the aforementioned examples.

The attribute about the target object 410 may refers to the attribute of the target object 410 and may be at least one of a user of the service providing device 300, at least one external device 350 connected to a network to which the service providing device 300 is connected, a position of the at least one external device 350 and content. The content may be stored in a storage 340 which is arranged in the service providing device 300 or may be stored in the at least one external device 350. For example, when the target object 410 is a TV, attributes of the TV may include a product name of the TV, the power consumption of the TV, a status of the TV, the brightness of the TV, or the like.

In an exemplary embodiment, when the target object 410 is the at least one external device 350, the service providing device 300 may receive information relating to the target object 410 and the attribute of the target object 410 from the at least one external device 350. In another exemplary embodiment, when the target object 410 relates to content, information relating the target object 410 and the attribute of the target object 410 may be obtained from metadata included in the content. In another exemplary embodiment, information about the target object 410 and the attribute of the target object 410 may be input from a user.

The information relating to the target object 410 and the attribute of the target object 410 may previously be set in the database 310 or may be obtained by using a method other than the methods of the aforementioned exemplary embodiments. Also, the information about the target object 410 and the attribute of the target object 410 may be temporarily used and may be deleted according to a process of one or more exemplary embodiments or may be stored as UI modeling information in the database 310 in which the service list 420 is stored.

In another exemplary embodiment, when the target object 410 of the service comprises at least one piece of content that is stored in the service providing device 300 or the at least one external device 350 connected to the network to which the service providing device 300 is connected, the service providing device 300 may select a service from the service list 420 stored in the database 310, according to information relating to a service attribute and information relating to an attribute of the content.

Afterward, the service providing device 300 may select a UI configuring element 630 which is stored in the database 310, based on the selected service (operation S120). Here, the UI configuring element 630 may be stored in a UI configuring element library in the database 310. The UI configuring element library maps the UI configuring element 630 and the service and then stores them.

Also, the UI configuring element 630 may define information to configure a UI which is to be displayed on a screen, according to the service to be provided.

Afterward, the service providing device 300 may display the UI including the UI configuring element 630 on the screen (operation S130). The screen indicates a surface used for the service providing device 300 to display an image. For example, the screen may be an output surface of a liquid crystal display (LCD), or may be a surface to which an image is projected by using a projector.

In an exemplary embodiment, the service providing device 300 may configure the UI including the UI configuring element 630 that is selected in operation S120, according to a layout rule 610 of the service providing device 300 which is previously set in the service providing device 300. The service providing device 300 may output the configured UI on the screen.

In another exemplary embodiment, the service providing device 300 may output a UI including a UI configuring element to the screen, wherein the UI configuring element is selected in consideration of information relating to a user of the service providing device 300. For example, when the user is a teenage girl, the service providing device 300 may output a UI 800 that is changed by enlarging an area for displaying UI configuring elements of "media service" and "message service".

Here, the information relating to the user may be directly input by the user or may be stored in the storage 340 of the service providing device 300. A method of obtaining the information relating to the user is not limited to the aforementioned manner and the information related to the user may be obtained by using various other methods. For example, the information related to the user may include an age of the user, a gender of the user, an occupation of the user, or the like.

In another exemplary embodiment, the service providing device 300 may display the UI configuring element 630 on the screen according to each of groups of a plurality of the external devices 350, wherein the groups are distinguished between the external devices 350 based on positions of the external devices 350. The groups that are distinguished between the external devices 350 based on the positions of the external devices 350 may be generated by the service providing device 300, or may be previously set. For example, the service providing device 300 may display UI configuring elements as a group on a predetermined region of the screen, wherein the UI configuring elements display a plurality of pieces of information relating to the external devices 350 positioned in a living room. Here, information relating to a position of the external device 350 may be received from the user, or may be obtained by the service providing device 300 after the service providing device 300 detects the position of the external device 350.

Afterward, when the database 310 is updated (operation S140), the service providing device 300 may perform again the aforementioned operations S110 through S130 and may then output a changed UI, according to the updated database 310.

Figure 2:
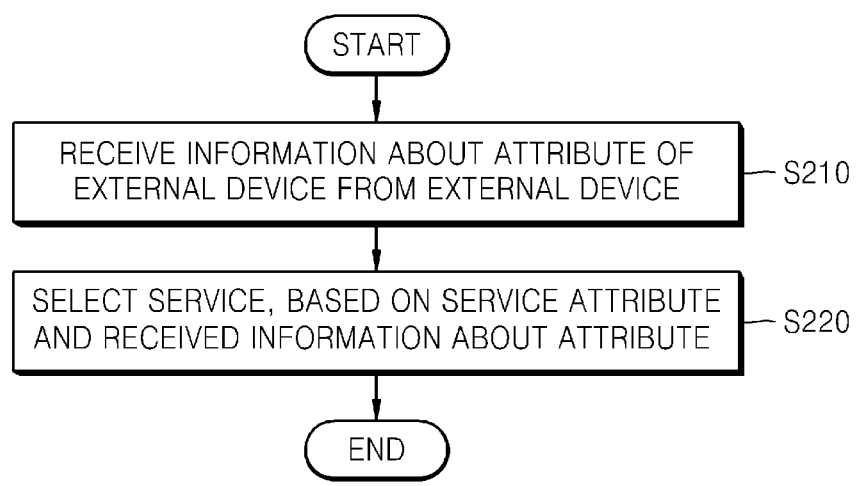
FIG. 2 is a flowchart of a method of selecting a service to be provided; when a target object is an external device, according to an exemplary embodiment.

FIG. 2 is a flowchart of a method of selecting a service to be provided, when the target object 410 is the external device 350, according to an exemplary embodiment.

The service providing device 300 may receive from the external device 350 information relating to an attribute of the external device 350 (operation S210). The external device 350 may include a device connected to a network to which the service providing device 300 is connected. For example, the external device 350 may be connected with the service providing device 300 via a home network, and the service providing device 300 may receive the information relating to the attribute of the external device 350 from the external device 350, via the home network.

Afterward, the service providing device 300 may select a service, based on a service attribute stored in the database 310 and the information relating to the attribute which is received from the external device 350 (operation S220).

Figure 3:
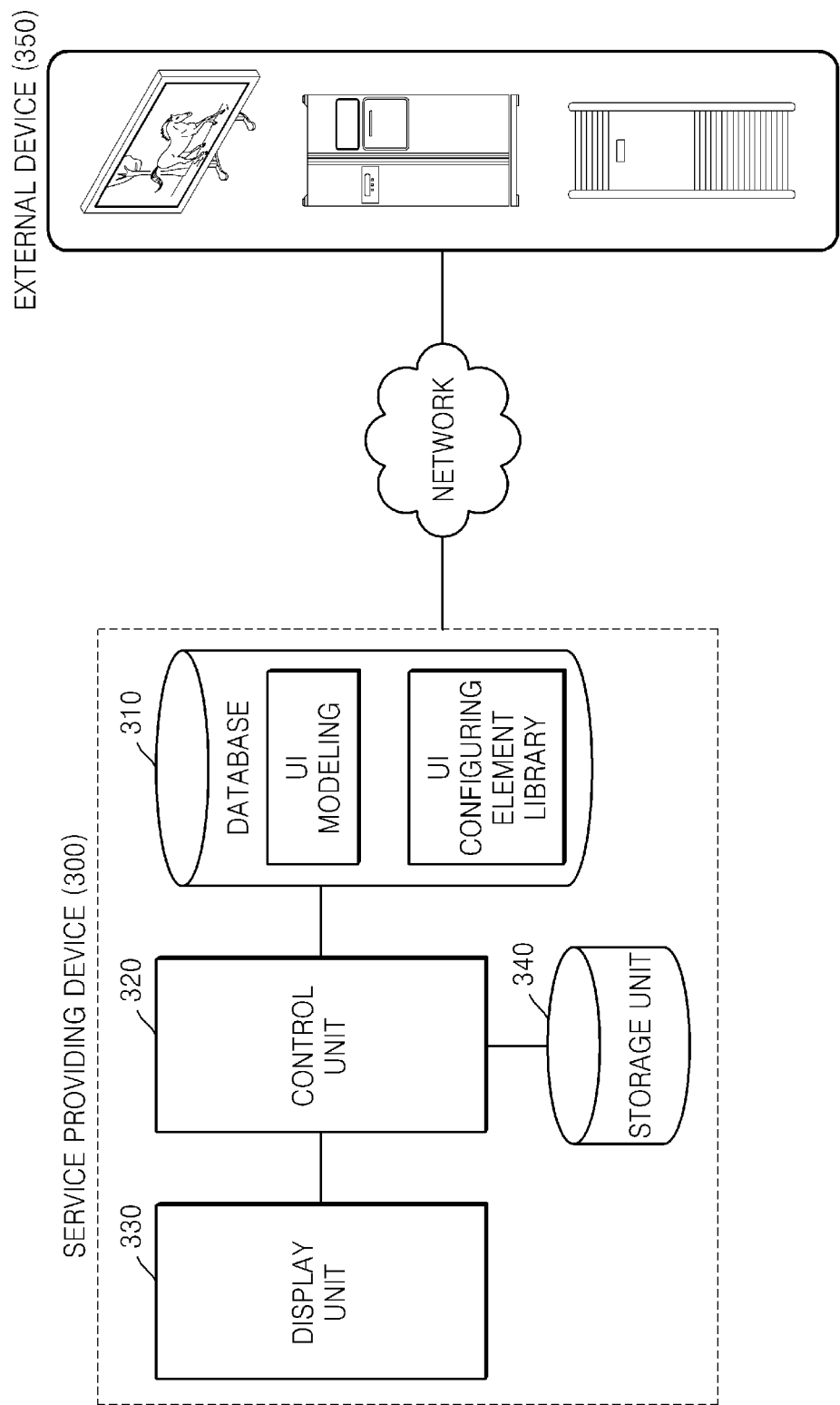
FIG. 3 is a diagram which illustrates a structure of the service providing device, according to an exemplary embodiment.

FIG. 3 is a diagram which illustrates a structure of the service providing device 300, according to an exemplary embodiment.

The service providing device 300 may include the database 310 storing UI modeling information and a UI configuring element library, a controller 320 including a processor capable of controlling each unit of the service providing device 300 and performing information processing, a display 330 which outputs a UI, and the storage 340 which stores information for information processing. Also, the service providing device 300 may be connected to the external device 350, via a network.

The database 310 may store a UI configuring element library in which the list 420 of services that the service providing device 300 may perform and UI configuring elements 630 are mapped. Here, the UI configuring element 630 may include at least one type of information to be included in a UI.

Also, the database 310 may include the service list 420 of the services that the service providing device 300 may provide, and information relating to at least one service attribute of each of the services.

Although the UI modeling and the UI configuring element library are described as separate concepts, the UI modeling and the UI configuring element library may not be separate but rather may be integrally configured.

The controller 320 may select a service to be provided via the service providing device 300 from the service list 420 stored in the database 310, and may select a UI configuring element that is mapped to the selected service and is stored in the database 310.

The controller 320 may select at least one service from the service list 420 stored in the database 310, based on an attribute relating to the target object 410 of the service.

The target object 410 of the service may include at least one external device 350 connected to a network to which the service providing device 300 is connected. The controller 320 may select the at least one service from the service list 420 stored in the database 310, based on the service attribute and an attribute received from the external device 350.

In an exemplary embodiment, when the target object 410 of the service comprises at least one piece of content that is stored in the storage unit 340 of the service providing device 300 or the at least one external device 350 connected to the network to which the service providing device 300 is connected, the controller 320 may select the at least one service from the service list 420, according to information related to the service attribute and information related to an attribute of the content.

The display 330 may display the UI, which includes the selected UI configuring element, on a screen.

In an exemplary embodiment, the display 330 may display the UI configuring element on the screen according to each of groups of a plurality of the external devices 350, where the groups are distinguished between the external devices 350 based on positions of the external devices 350.

In another exemplary embodiment, the display 330 may output a UI including a UI configuring element to the screen, wherein the UI configuring element is selected in consideration of information relating to a user of the service providing device 300.

In an exemplary embodiment, the service providing device 300 may display a UI that is changed according to an update of the database 310 on the screen.

FIG. 4 illustrates a structure of UI modeling information stored in the database 310, according to an exemplary embodiment.

In the exemplary embodiment, the database 310 may store the service list 420 of services that the service providing device 300 may perform, and may store a service attribute of each of the services, as the UI modeling information. The service providing device 300 may select a service to be provided from the service list 420, according to the service attribute and an attribute of the target object 410.

When a service attribute of a service included in the service list 420 is included in attributes of the target object 410, the service providing device 300 may select the corresponding service. For example, when the target object 410 includes a TV, "product name, power consumption," which is a service attribute of an ON/OFF service, is included in the attributes of the TV. Thus, in this case, the service providing device 300 may select the ON/OFF service with respect to the TV. As another example, when the target object 410 includes a picture, "product name, power consumption," which is the service attribute of the ON/OFF service, is not included in attributes of the picture. On the other hand, "* name," which is an attribute of a search service, corresponds to the "file name" of the attributes of the picture. Thus, the service providing device 300 may not select the ON/OFF service with respect to the picture but may select the search service with respect to the attributes of the picture.

FIG. 5 illustrates a UI configuring element library stored in the database 310, according to an exemplary embodiment.

In an exemplary embodiment, services and UI configuring elements may be mapped and stored in the UI configuring element library stored in the database 310.

In the UI configuring element library of FIG. 5, a UI configuring element ID means an identification (ID) value that is previously set so as to distinguish between the UI configuring elements. The UI configuring element ID may be applied to each of the UI configuring elements.

A service refers to services included in the service list 420.

An information type refers a type of information to be included in the UI configuring element, according to the service list 420. For example, a text, an image, an input window, or the like may be included in the information type.

A service attribute refers to information about an attribute of each of the services.

The UI configuring element may define information to be displayed in a UI according to a service to be provided by the service providing device 300. For example, weather information, a date, a text, an image, an icon, or the like may be included in the UI configuring element.

In an exemplary embodiment, the UI configuring element may be generated by combining the service attribute with an information type that corresponds to the service attribute. Also, in another exemplary embodiment, the UI configuring element may be a value that is previously set in the database 310.

In the UI configuring element library of FIG. 5, a UI configuring element (with values) means a value of a UI to be displayed on a screen, wherein the UI includes a UI configuring element based on the target object 410.

The items of the UI configuring element library of FIG. 5 are exemplary, and thus, it is not necessary to equally configure the UI configuring element library as shown in FIG. 5. For example, the UI configuring element library may be configured while the information type, the service attribute, and the UI configuring element (with values) are excluded from fields shown in FIG. 5.

Figure 6:
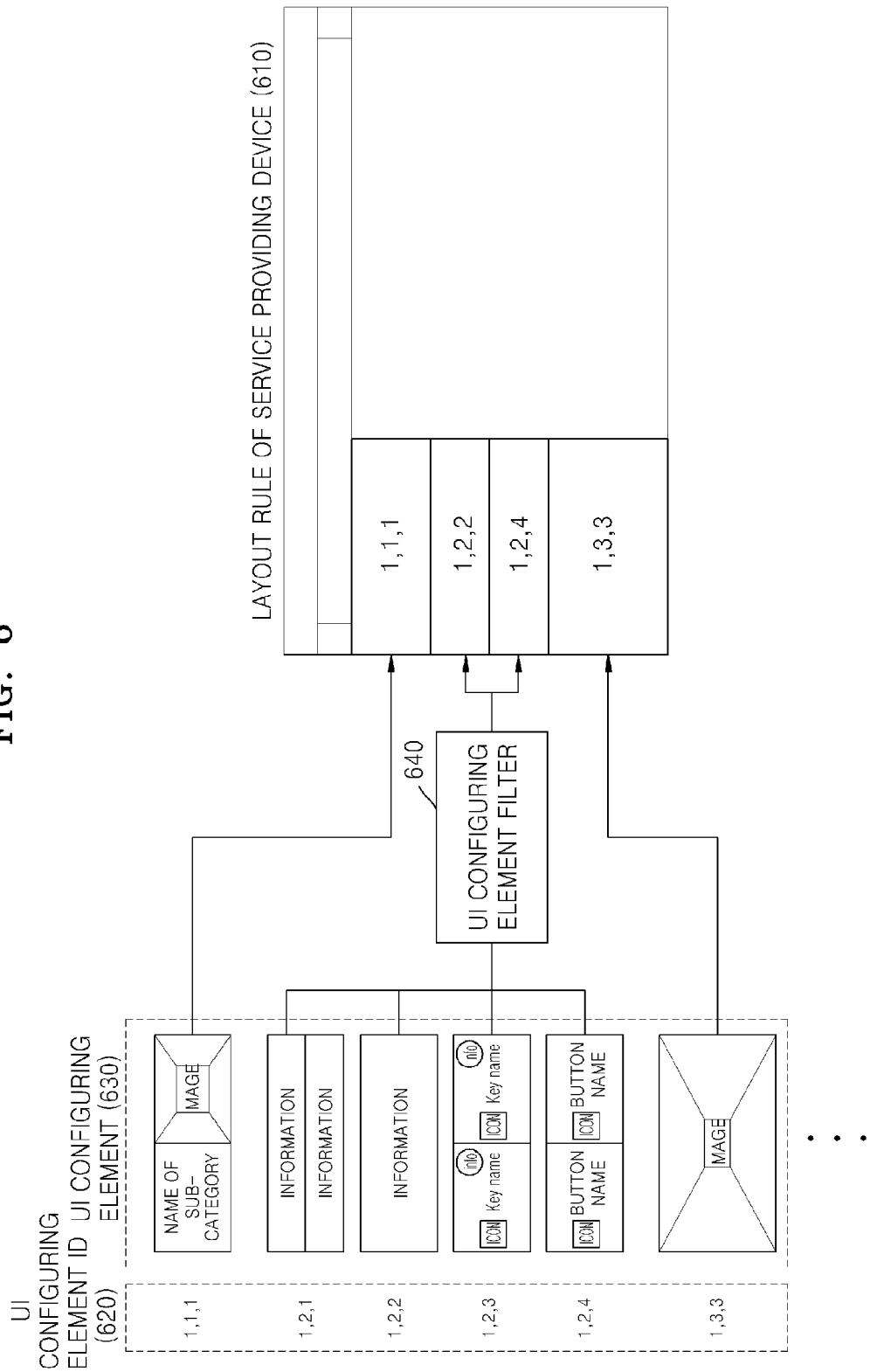
FIG. 6 is a diagram related to a method of configuring a UI, including a selected UI configuring element, according to an exemplary embodiment.

FIG. 6 is a diagram which relates to a method of configuring a UI including a selected UI configuring element, according to an exemplary embodiment.

In an exemplary embodiment, the service providing device 300 may arrange a UI configuring element 630 in the UI, wherein the UI configuring element 630 matches a UI configuring element ID 620 that is determined according to the layout rule 610 of the service providing device 300.

The layout rule 610 of the service providing device 300 may be previously set in the service providing device 300. Also, the layout rule 610 may be changed according to a total number or a type of UI configuring element 630.

In this exemplary embodiment, when one or more pieces of information to be displayed via the UI configuring elements 630 overlap with each other, the service providing device 300 may exclude the UI configuring element 630 which includes the overlapping information, by using a UI configuring element filter 640, and may configure the UI.

Figure 7:
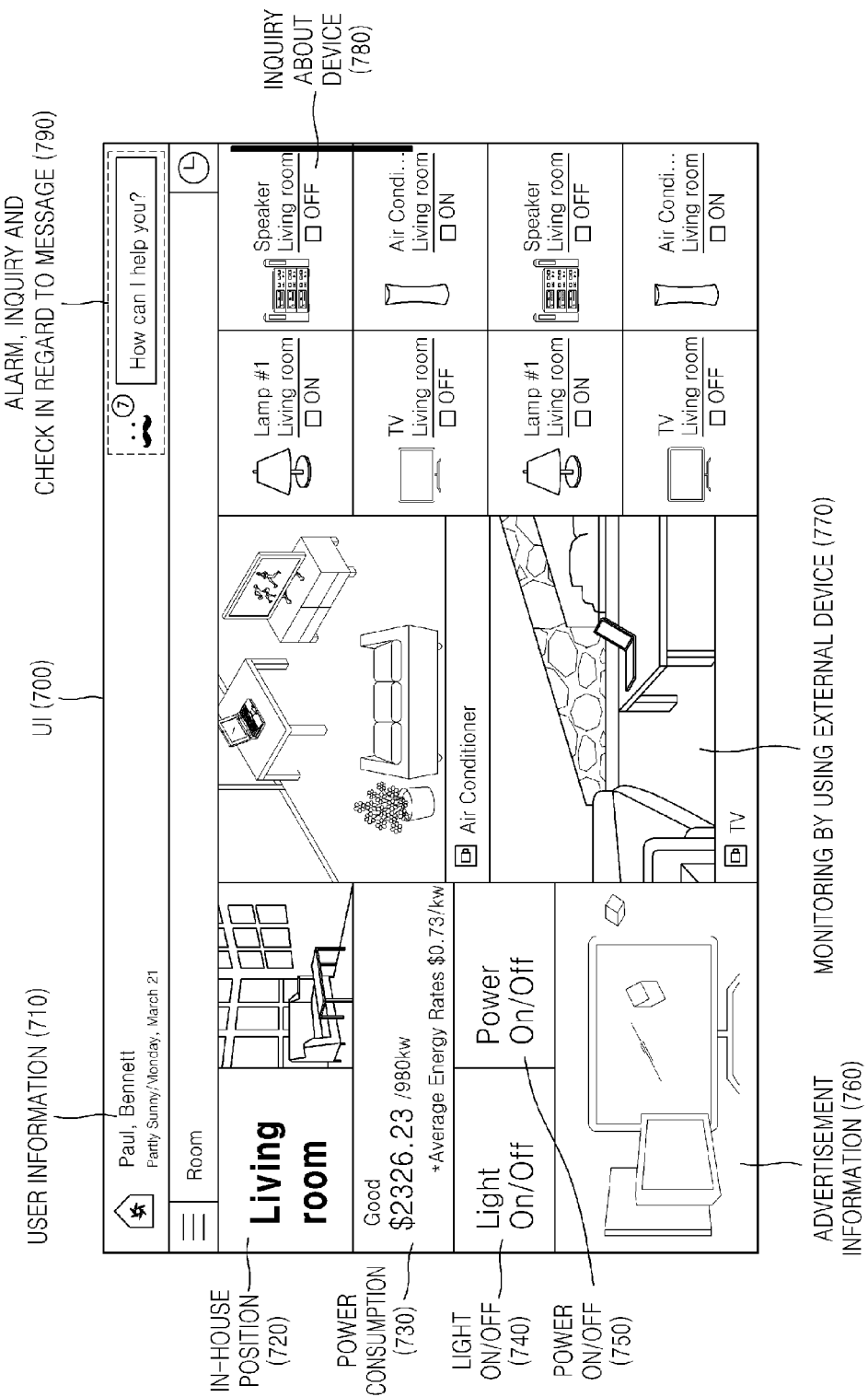
FIG. 7 illustrates a UI that is output to a screen of the service providing device, according to an exemplary embodiment.

FIG. 7 illustrates a UI 700 that is output to a screen of the service providing device 300, according to an exemplary embodiment.

As illustrated in FIG. 7, the UI 700 that is output to the screen of the service providing device 300 may display UI configuring elements such as user information 710 which displays information relating to a user of the service providing device 300, an in-house position 720 displaying a selected position in a house, power consumption 730 displaying power consumption of an external device, light ON/OFF 740 controlling a power of a lighting apparatus, power ON/OFF 750 controlling a power of the external device, advertisement information 760 providing an advertisement, UI configuring element 770 about monitoring by using an external device, an inquiry about a device 780 displaying an external device that corresponds to the selected position in the house, and an alarm, inquiry and check regarding message 790.

FIG. 8 illustrates an example in which UIs that are changed according to users are output, according to an exemplary embodiment.

In this exemplary embodiment, the service providing device 300 may display a UI 800 that is changed according to information relating to a user.

For example, when the information relating to a user of the service providing device 300 indicates the user to be a 45-year old housewife 810, the UI 800 that is changed by enlarging UI configuring elements related to a device control service, a usage mode service and a monitoring service may be displayed on a screen. In another example, when the information relating to the user of the service providing device 300 indicates the user to be a 15-year old daughter 820, the UI 800 that is changed by enlarging UI configuring elements related to a media service and a message service may be displayed on the screen.

The information relating to the user may be received from the user or may be obtained by using one of various methods, including face recognition, or the like.

The service providing device 300 may output the UI 800 that is changed according to the information relating to the user or to a user input with respect to selection or deletion of a predetermined service.

Figure 9:
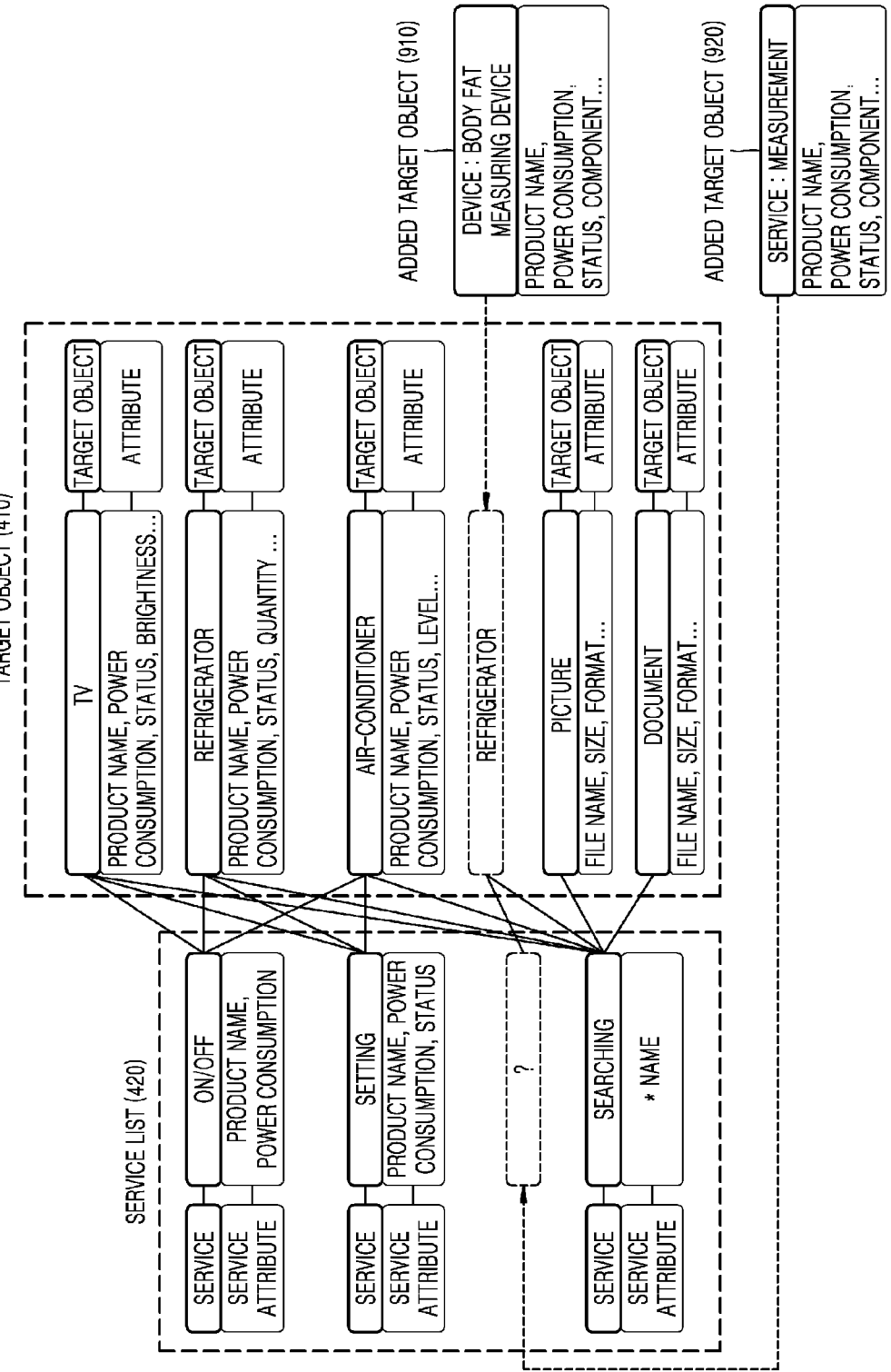
FIG. 9 is a diagram which illustrates UI modeling information stored in the database, according to an exemplary embodiment.

FIG. 9 is a diagram which illustrates UI modeling information stored in the database 310, according to an exemplary embodiment.

In this exemplary embodiment, when the target object 410 and the service list 420 are stored in the database 310, a target object 910 may be added to the database 310. For example, when a new external device is connected with a home network, information relating to an attribute which is transmitted from the new external device to the service providing device 300 may be added to the database 310. The service providing device 300 may select a service that is included in the service list 420 according to the addition of the target object 910. In another exemplary embodiment, when content is added to the service providing device 300, the service providing device 300 may select a service included in the service list 420, based on the target object 410 including the added content.

Also, since a new service 920 is added to the service list 420 of the database 310, the service providing device 300 may select a service to be provided according to the target object 410, from the service list 420 that includes a newly added service 920.

The exemplary embodiments of the present disclosure may be embodied in a recording medium, e.g., as a program module to be executed in computers, which includes computer-readable commands. A computer storage medium may include any usable medium that may be accessed by computers, volatile and non-volatile media, and detachable and non-detachable media. Also, the computer storage medium may include both a computer storage medium and a communication medium. Non-transitory computer storage medium includes all of volatile and non-volatile media, and detachable and non-detachable media, which are designed to store information including computer readable commands, data structures, program modules or other data. The communication medium includes computer-readable commands, a data structure, a program module, and other transmission mechanisms, and includes other information transmission media.

The present invention may, however, be embodied in many different forms and should not be construed as being limited to the exemplary embodiments set forth herein. Rather, these embodiments are provided so that this disclosure will be thorough and complete, and will fully convey the disclosure to those of ordinary skill in the art. For example, configuring elements that are singular forms may be executed in a distributed fashion, and also, configuring elements that are distributed may be combined and then executed.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of outputting a user interface (UI), the method performed by a service providing device configured to provide a UI to provide a service to a user, the method comprising:
   selecting the service to be provided via the service providing device;
   selecting a UI configuring element stored in a database, based on the selected service;
   displaying on a screen a UI including the UI configuring element,
   determining whether the UI configuring element comprises a first information matching a second information of another UI configuring element, the first information comprises a first icon of the UI configuring element and the second information comprises a second icon of the another UI configuring element; and
   in response to determining that the first icon matches the second icon, controlling the second information to not be displayed on the UI while the first information of the UI configuring element is displayed on the UI,
   wherein selecting of the service further comprises:
      obtaining a target object attribute of a target object for the service and a service attribute of the service,
      comparing the target object attribute to the service attribute, and
      determining whether the service attribute matches the target object attribute,
   wherein the service comprises the service attribute corresponding to the target object attribute.

2. The method of claim 1, wherein the UI configuring element comprises an information type of at least one piece of the first information displayed in the UI.

3. The method of claim 1, wherein the database comprises a list of services that the service providing device can perform and information comprising at least one of a plurality of service attributes of each of the services,
   wherein the selecting of the service further comprises selecting the service from the service list stored in the database, based on the target object attribute of the target object for the service,
   wherein the service is one of the services, and
   wherein the service attribute is one of the plurality of service attributes.

4. The method of claim 3, wherein the target object of the service comprises one or more external devices connected to a network to which the service providing device is connected, and
   wherein the selecting of the service comprises:
      receiving information relating to at least one of a plurality of target object attributes of each of one or more external devices from the one or more external devices; and
      selecting the service from the service list stored in the database, based on the service attribute and the information relating to the target object attribute, and
   wherein the target object attribute is one of the plurality of target object attributes.

5. The method of claim 4, wherein the displaying of the UI comprises displaying the UI configuring element on the screen, according to groups of the one or more external devices, wherein the groups are distinguished between the one or more external devices based on positions of the one or more external devices.

6. The method of claim 3, wherein the target object of the service comprises at least one piece of content that is stored in the service providing device or at least one external device connected to a network to which the service providing device is connected, and
   wherein selecting the service further comprises selecting the service from the service list stored in the database, according to information relating to the service attribute and information relating to a content attribute of the at least one piece of content.

7. The method of claim 3, wherein the target object attribute of the service is one of a user of the service providing device, at least one external device connected to a network to which the service providing device is connected, a position of the at least one external device and content.

8. The method of claim 1, wherein the displaying of the UI comprises outputting the UI comprising the UI configuring element that is selected in consideration of information relating to a user of the service providing device, on the screen.

9. The method of claim 8, wherein the information relating to the user comprises at least one of an age of the user, a gender of the user and an occupation of the user.

10. The method of claim 1, wherein the displaying of the UI comprises displaying on the screen a UI that is changed according to an update of the database.

11. A non-transitory computer-readable recording medium having recorded thereon, wherein the program, when executed by a processor of a computer causes the computer to execute the method of claim 1.

12. A service providing device for providing a user interface (UI) configured to provide a service to a user, the service providing device comprising:
   a database configured to map a list of services that the service providing device can perform to UI configuring elements, and configured to store the service list and the UI configuring elements;
   a controller configured to control the service to be provided via the service providing device from the service list stored in the database, and configured to select a UI configuring element stored in the database, based on the service; and
   a display configured to display on a screen a UI including the UI configuring element,
   wherein the controller is further configured to
   determine whether the UI configuring element comprises a first information matching a second information of another UI configuring element, the first information comprises a first icon of the UI configuring element and the second information comprises a second icon of the another UI configuring element,
   in response to determining that the first icon matches the second icon, control the second information to not be displayed on the UI while the first information of the UI configuring element is displayed on the UI,
   obtain a target object attribute of a target object for the service and a service attribute of the service,
   compare the target object attribute to the service attribute, and
   determine whether the service attribute matches the target object attribute,
   wherein the service comprises the service attribute corresponding to the target object attribute.

13. The service providing device of claim 12, wherein the UI configuring element comprises an information type of at least one piece of the first information configured to be in the UI.

14. The service providing device of claim 12, wherein the database comprises a list of services that the service providing device is configured to perform, and comprises information comprising at least one of a plurality of service attributes of each of the services, and
the controller is configured to select the service from the service list stored in the database, further based on a target object attribute of the target object for the service,
the service is one of the services, and
the service attribute is one of the plurality of service attributes.

15. The service providing device of claim 14, wherein the target object of the service comprises one or more external devices configured to be connected to a network to which the service providing device is connected,
the service providing device is configured to receive information relating to at least one of a plurality of target object attributes of each of one or more external devices from the one or more external devices, and
the controller is configured to select the service from the service list stored in the database, based on the service attribute and the information related to the target object attribute, and
the target object attribute is the at least one of the plurality of target object attributes.

16. The service providing device of claim 15, wherein the display is configured to display the UI configuring element on the screen, according to groups of the one or more external devices, wherein the groups are distinguished between the one or more external devices based on positions of the one or more external devices.

17. The service providing device of claim 14, wherein the target object of the service comprises at least one piece of content that is configured to be stored in the service providing device or at least one external device connected to a network to which the service providing device is connected, and
the controller is further configured to select the service from the service list stored in the database, according to information relating to the service attribute and is configured to select information related to a content attribute of the at least one piece of content.

18. The service providing device of claim 14, wherein the target object attribute of the service is one of a user of the service providing device, at least one external device connected to a network to which the service providing device is connected, a position of the at least one external device, and content.

19. The service providing device of claim 12, wherein the display is configured to output on the screen the UI comprising the UI configuring element that is selected in consideration of information relating a user of the service providing device.

20. The service providing device of claim 19, wherein the information relating to the user comprises at least one of an age of the user, a gender of the user and an occupation of the user.

21. The service providing device of claim 12, wherein the service providing device displays on the screen a UI that is changed according to an update of the database.

22. A service providing device for providing a user interface (UI), the service providing device comprising:
a database configured to map a service list, of a plurality of services, for UI configuring elements, and store the service list and the UI configuring elements;
a controller configured to select a UI configuring element stored in the database; and
a display configured to display on a screen a UI including the UI configuring element,
wherein the controller is further configured to
determine whether the UI configuring element comprises a first information matching a second information of another UI configuring element, the first information comprises a first icon of the UI configuring element and the second information comprises a second icon of the another UI configuring element,
in response to determining that the first icon matches the second icon, control the second information to not be displayed on the UI while the first information of the UI configuring element is displayed on the UI,
obtain a target object attribute of a target object for a service and a service attribute of the service,
compare the target object attribute to the service attribute, and
determine whether the service attribute matches the target object attribute,
wherein the service comprises the service attribute corresponding to the target object attribute.

23. The service providing device of claim 22, wherein the UI configuring element comprises an information type of at least one piece of the first information configured to be in the UI.

24. The service providing device of claim 22, wherein the database comprises the service list that the service providing device is configured to perform, and comprises information comprising at least one of a plurality of service attributes of each of the services of the service list,
the controller is configured to select the service from the service list stored in the database, further based on the target object attribute of the target object for the service, and
the service is one of the services, and
the service attribute is one of the plurality of service attributes.

25. The service providing device of claim 24, wherein the target object attribute of the service is one of a user of the service providing device, at least one external device connected to a network to which the service providing device is connected, a position of the at least one external device, and a content.

26. The method of claim 1, wherein the UI comprises services provideable to external devices located in a single room identified by the UI.

27. The method of claim 26, wherein the UI comprises a monitoring display, of the single room, provided by at least one of the external devices.

28. The method of claim 1, wherein the target object attribute is a capability of a target object, and the service attribute is mapped to the target object.

29. The method of claim 1, wherein the target object is a television (TV) and the tag of the target object attribute is at least one of a product name, a power consumption, a status and a brightness of the TV, and
the tag of the service attribute is at least one of the product name, the power consumption, the status and the brightness of the TV.

30. The method of claim 6, wherein the target object attribute is obtained from metadata included in the at least one piece of content.

31. The method of claim 1, wherein the UI configuring element is filtered from a plurality of other UI configuring elements comprising information matching the first information.

\* \* \* \* \*